(12) United States Patent
Kimmel

(10) Patent No.: US 11,264,738 B2
(45) Date of Patent: Mar. 1, 2022

(54) QUICK CONNECTION SYSTEM

(71) Applicant: Twisted Ideas, Inc., Tappan, NY (US)

(72) Inventor: Reed Kimmel, Tappan, NY (US)

(73) Assignee: Twisted Ideas, Inc., Tappan, NY (US)

( * ) Notice: Subject to any disclaimer, the term of this patent is extended or adjusted under 35 U.S.C. 154(b) by 0 days.

(21) Appl. No.: 16/931,457

(22) Filed: Jul. 17, 2020

(65) Prior Publication Data
US 2020/0350707 A1 Nov. 5, 2020

Related U.S. Application Data

(62) Division of application No. 16/526,102, filed on Jul. 30, 2019, now Pat. No. 10,756,453.
(Continued)

(51) Int. Cl.
| | | |
|---|---|---|
| *H01R 13/60* | (2006.01) | |
| *H01R 4/00* | (2006.01) | |
| *H01R 13/26* | (2006.01) | |
| *H01R 9/24* | (2006.01) | |
| *H01R 9/22* | (2006.01) | |
| *F21V 23/00* | (2015.01) | |
| *H02G 3/08* | (2006.01) | |
| *H02G 3/16* | (2006.01) | |

(Continued)

(52) U.S. Cl.
CPC .............. *H01R 4/54* (2013.01); *F21V 23/001* (2013.01); *F21V 23/06* (2013.01); *H01R 4/56* (2013.01); *H01R 9/226* (2013.01); *H01R 9/24* (2013.01); *H01R 13/26* (2013.01); *H02G 3/081* (2013.01); *H02G 3/16* (2013.01)

(58) Field of Classification Search
CPC ...... H01R 11/284; H01R 11/282; H01R 4/54; H01R 4/56; H01R 9/226; H01R 9/24; H01R 13/26; H01R 13/74; F21V 23/001; F21V 23/06

USPC ......................................... 439/202, 388, 522
See application file for complete search history.

(56) References Cited

U.S. PATENT DOCUMENTS 1,181,742 A * 5/1916 Coolidge ................. H01H 1/02
200/268
1,658,713 A 2/1928 Fuller
(Continued)

FOREIGN PATENT DOCUMENTS

| CA | 2658172 A1 | 9/2010 |
|---|---|---|
| WO | 03034548 A1 | 4/2003 |

OTHER PUBLICATIONS

Anonymous, RV-Power-Cord Adapter, URL: https://leisurecw.com/product/rv-power-cord-adapter-15-amp-male-to-50-amp-twist-lock-female-camper-detachable/ Published/Accessed: Jul. 27, 2018.
(Continued)

*Primary Examiner* — Thanh Tam T Le
(74) *Attorney, Agent, or Firm* — Werschulz Patent Law, LLC; Patricia P. Werschulz, Esq.

(57) ABSTRACT

A conductive pin configured for a quick connection system. The conductive pin has a non-conductive head and a conducting shaft with a conductive shaft bottom contact point. Beneath the head are a plurality of conducting contact arms in a X-configuration, each arm at a right angle to the next and separate to an adjacent conducting contact arm. The conducting shaft has a partial non-conductive sheath below the head. Rotating the conducting contact arms to contact points by rotating the conductive pin completes the circuit in the quick connection system.

1 Claim, 10 Drawing Sheets

Related U.S. Application Data

(60) Provisional application No. 62/765,300, filed on Aug. 20, 2018.

(51) Int. Cl.
*F21V 23/06* (2006.01)
*H01R 4/56* (2006.01)

(56) References Cited

U.S. PATENT DOCUMENTS

| | | | |
|---|---|---|---|
| 2,796,495 A * | 6/1957 | Keitel | H01H 1/02372 200/266 |
| 3,798,584 A | 3/1974 | Person | |
| 3,985,417 A | 10/1976 | Fenton | |
| 4,080,604 A * | 3/1978 | Wosniewski | H01Q 9/14 343/745 |
| 4,645,286 A | 2/1987 | Isban et al. | |
| D293,710 S | 1/1988 | Woods | |
| 4,726,780 A | 2/1988 | Thackeray | |
| 4,904,195 A | 2/1990 | Thackeray | |
| D320,082 S | 9/1991 | Wyatt et al. | |
| 5,313,015 A * | 5/1994 | Hoge | H01R 4/2404 174/362 |
| 5,893,772 A | 4/1999 | Carmo et al. | |
| 6,325,667 B2 | 12/2001 | Sawayanagi | |
| 6,358,076 B1 | 3/2002 | Haag | |
| D460,571 S | 7/2002 | Schimmelpfennig | |
| D470,818 S | 2/2003 | Cheng | |
| 6,592,311 B2 * | 7/2003 | Wojciechowski | B23P 19/062 411/107 |
| 6,676,442 B2 | 1/2004 | Kerr, Jr. | |
| 6,979,107 B1 | 12/2005 | Benensohn | |
| 6,997,740 B2 | 2/2006 | Kerr | |
| 7,064,269 B2 | 6/2006 | Smith | |
| 7,117,591 B1 | 10/2006 | Gretz | |
| 7,183,483 B1 | 2/2007 | Anderson et al. | |
| D545,664 S | 7/2007 | Fields | |
| 7,297,022 B2 | 11/2007 | Pearce | |
| D562,987 S | 2/2008 | Colin et al. | |
| 7,401,394 B1 * | 7/2008 | Muller | B23P 19/062 29/432.1 |
| 7,631,994 B2 | 12/2009 | Halliwell et al. | |
| 7,658,505 B2 | 2/2010 | Howell | |
| 7,786,379 B1 | 8/2010 | Kwong et al. | |
| 7,815,406 B2 * | 10/2010 | Babej | B23P 19/062 411/181 |
| D642,548 S | 8/2011 | Bowen, III | |
| 8,376,777 B2 | 2/2013 | Smith | |
| D678,516 S | 3/2013 | Wong | |
| 8,931,936 B1 | 1/2015 | Tham et al. | |
| D726,365 S | 4/2015 | Weigensberg | |
| 9,175,715 B2 * | 11/2015 | Babej | F16B 19/00 |
| 9,450,348 B2 | 9/2016 | O'Rourke | |
| D805,193 S | 12/2017 | Shoji et al. | |
| D813,552 S | 3/2018 | Katsuma | |
| 9,997,877 B2 * | 6/2018 | Carbone | H01R 13/42 |
| D837,346 S | 1/2019 | Lee | |
| 10,218,103 B2 * | 2/2019 | Ostermann | H01R 13/111 |
| D847,595 S | 5/2019 | Hampton | |
| D863,222 S | 10/2019 | Kimmel | |
| 2010/0074712 A1 * | 3/2010 | Shinjo | F16B 37/068 411/337 |
| 2013/0022782 A1 | 1/2013 | Babej | |
| 2015/0086036 A1 | 3/2015 | Wang | |
| 2016/0091008 A1 | 3/2016 | Cerfeuille | |
| 2016/0093995 A1 | 3/2016 | Carbone et al. | |
| 2017/0244187 A1 | 8/2017 | Ostermann et al. | |
| 2019/0215997 A1 | 7/2019 | Hirooka et al. | |
| 2020/0059016 A1 | 2/2020 | Kimmel | |

OTHER PUBLICATIONS

Capstone Light with Sound Bath Vanity Light, Amazon.com, https://www.amazon.com/Capstone-Light-Sound-Bath-Vanity/dp/B01HTZVUPC/ref=sr_1_1?keywords=Capstone+Light+with+Sound+Bath+Vanity+Light%3A+Home+%26+Kitchen&qid=1564163295&s=gateway&sr=8-1.

Hubbell HBL7485 AC Plug NEMA ML-3P Male Black—Our Item #: 9327, https://www.stayonline.com/detail.aspx?id=14040.

Lev-Lok Advantage: A faster, safer & more accurate connection, https://www.leviton.com/en/products/brands/levlok.

* cited by examiner

QUICK CONNECTION SYSTEM

CROSS-REFERENCE TO RELATED APPLICATIONS

This application is a divisional nonprovisional utility application of the nonprovisional utility patent application, Ser. No. 16/526,102, filed in the United States Patent Trademark office on Jul. 30, 2019, which claims priority to the provisional patent application, Ser. No. 62/765,300 filed in the United States Patent and Trademark Office on Aug. 20, 2018 and claims the priority thereof and is expressly incorporated herein by reference in its entirety.

TECHNICAL FIELD

The present disclosure relates generally to an electrical connection system. More particularly, the present disclosure relates to a quick connection system for installing a fixture to house current.

BACKGROUND

One of the more challenging tasks for the DIYer at home is installing ceiling and wall fixtures. Most homes have ceiling fixtures such as flushmount lights, chandeliers, fans and the like on the inside and flushmount lights, pendant lights, security cameras and the like on the exterior. Often lights are wall mounted such as sconces and vanity lights.

While there are battery powered versions of these fixtures that are useful, the vast majority are powered by AC (alternating current), frequently referred to as house current. That means that the home handyman or handywoman must juggle tools and fixtures while perched on a ladder when it comes time to install or replace a fixture or device. In addition, the DIYer must make sure that the connections are solid, that no naked wires cross, and that the fixture is properly grounded.

The only gadgets available to help with the connection are plastic wire connectors that take two wire ends and twist them together to make contact inside the cone of the connector.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system that allows a quick electrical connection of a wall-mounted or ceiling-mounted fixture without requiring tools when making the connection.

Accordingly, an aspect of an example embodiment in the present disclosure provides a light fixture or the like with a plate having a conductive track and conductive pins, a plate for a junction box having a conductive track with a plurality of openings such that when the conductive pins of the fixture are inserted into the openings in the junction box plate, an electrical connection is made between the fixture and the junction box.

Another aspect of an example embodiment in the present disclosure is to provide a kit to retrofit a fixture or a junction box to take an advantage of the quick connection system. Accordingly, the present disclosure provides a kit having the fixture plate, a junction box plate and a pair of connective pins and to retrofit a junction box and a fixture.

Accordingly, the present disclosure describes a quick connection system and method of installing a wall-mounted or ceiling-mounted fixture to house current. The system comprises a light fixture or the like with a plate having a conductive track and a pair of conductive pins, a plate for a junction box having a conductive track with a plurality of openings such that when the conductive pins of the fixture are inserted into the openings in the junction box plate, an electrical connection is made between the fixture and the junction box.

A kit is provided having a light fixture or the like with a plate having a conductive track and conductive pins, a plate for a junction box having a conductive track have a plurality of openings to accommodate the conductive pins. The kit is useful for retrofitting the junction box or light fixture and the like. A method of using the system and the kit is disclosed.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

FIGS. 1-4 illustrate a system for making a quick electrical connection between a junction box 20 and a fixture 30, connecting the AC (alternating current), hereafter referred to as house current 22 to the fixture 30. The example embodiment of the system for quick electrical connection provides a method of quickly connecting fixtures to the house current. The example embodiment of the system further provides a kit to retrofit fixtures and junction boxes for use in the system.

House current 22 typically has three wires: house line wire 12A, house neutral wire 12B and house ground wire 12C. The line wire is often referred to as the "hot" or "live" wire. For the purposes of the present application, the line that carries the current to the fixture is the "line" wire. As understood by those of ordinary skill in the art, the neutral wire completes the circuit and carries current back to the source and the ground wire provides a path to the ground (earth).

Figure 1:
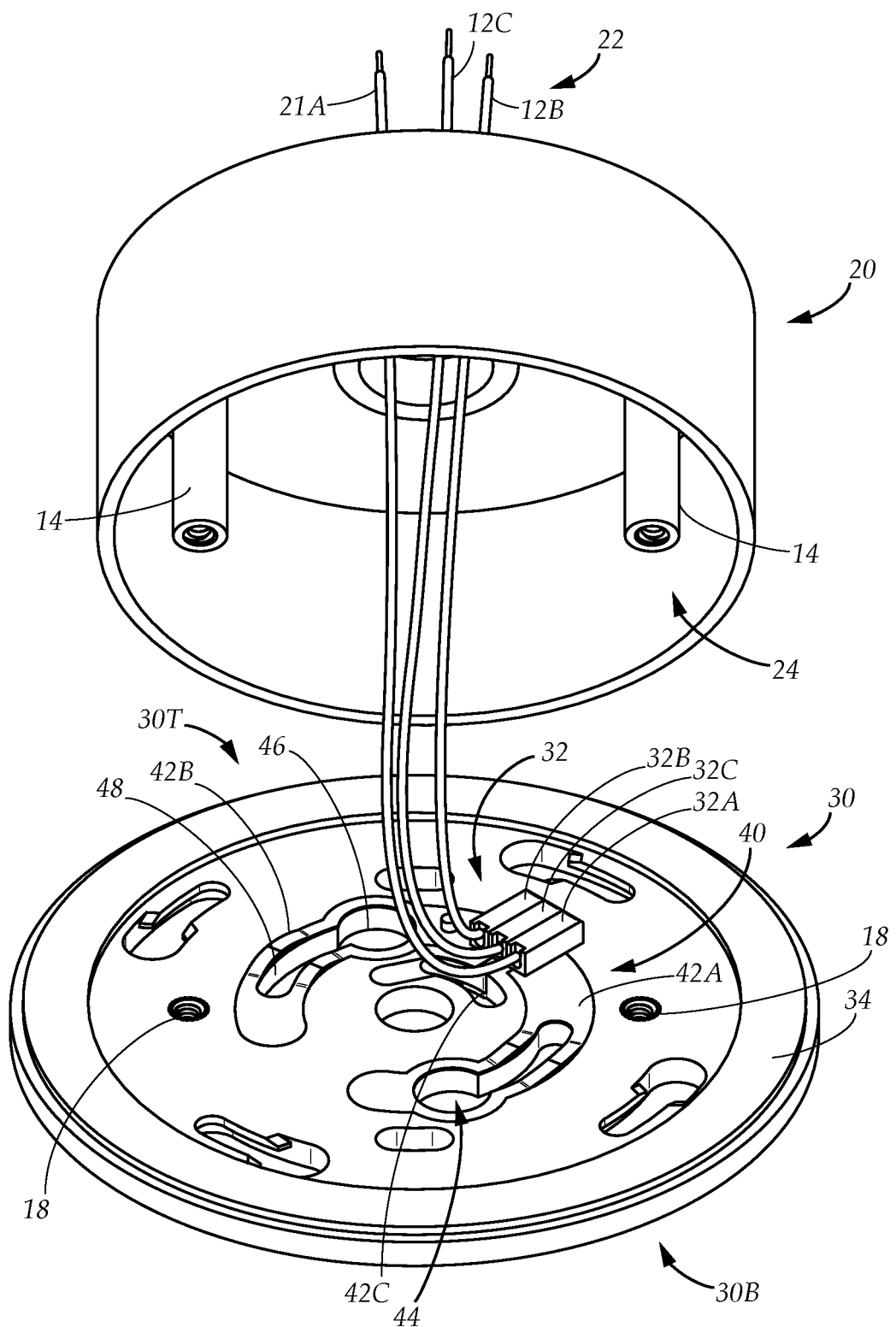
FIG. 1 is a perspective exploded view of an example embodiment of a junction box and a junction box plate in a system for quick electrical connection.
Figure 2:
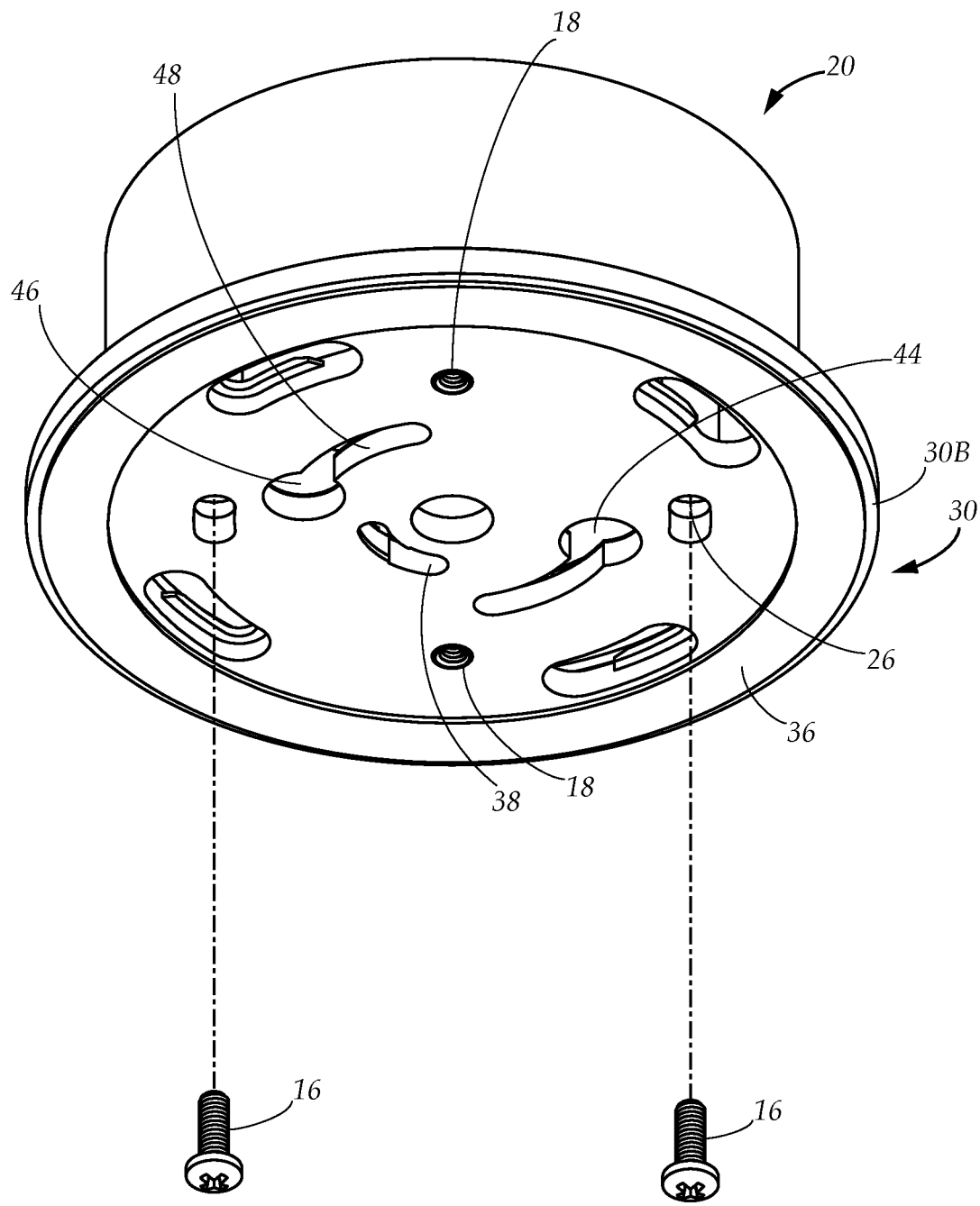
FIG. 2 is a perspective view of the example embodiment of an assembled junction box and the junction box plate in the system for quick electrical connection.

In FIG. 1, the junction box 20 has outwardly-facing junction box opening 24. Over the junction box opening 24 is covered by a junction box plate 30. The junction box plate 30 has a junction box plate top 30T facing the junction box 20 and an outwardly-facing junction box plate bottom 30B as shown in FIG. 2. The junction box plate bottom 30 is constructed from non-conducting insulating material, such as the non-limiting examples of plastic, wood or rubber.

On the junction box plate top 30T is a junction box conductive track 40. The junction box conductive track 40 is constructed from conducting materials such as steel, copper, aluminum and other conducting metals as non-limiting examples. The junction box conductive track 40 is resilient, which is defined herein the ability to spring back into shape after compression.

The junction box conductive track 40 has a plurality of junction arcuate arms 42, two of which are shown in FIG. 1, a first junction arcuate arm 42A and a second junction arcuate arm 42B. The junction arcuate arms 42 each have an opening 44 inside the junction box conductive track 40. The openings 44 have a circular head 46 and a curved tail 48. The second junction arcuate arm 42B is the inverted mirror image of the first junction arcuate arm 42A. Between the junction arcuate arms 42 is a ground arm 42C that is not clearly visible in FIG. 1, but extends into a ground arm opening 38. The ground arm 42C is L-shaped.

The junction box plate top 30T has a plurality of junction wire terminals 32, a first junction wire terminal 32A, a second junction wire terminal 32B and a third junction wire terminal 32C.

The first junction wire terminal 32A is electrically connecting to the house line wire 12A and is electrically connecting to the first junction arcuate arm 42A thereby placing the house line wire in electrical communication with the first junction arcuate arm 42A.

The second junction wire terminal 32B is electrically connecting to the house neutral wire 12B and is electrically connecting to the second junction arcuate arm 42B, thereby placing the house neutral wire 12B in electrical communication with the second junction arcuate arm 42B.

The third junction wire terminal 32C is electrically connecting to the house ground wire 12C and is electrically connecting to the ground arm 42C, thereby placing the house ground wire 12C in electrical communication with the ground arm 42C.

Referring to FIGS. 1-2, the junction box plate top 30T has a gasket 34. The junction box plate bottom 30B has a gasket channel to receive a second gasket 34.

Figure 5:
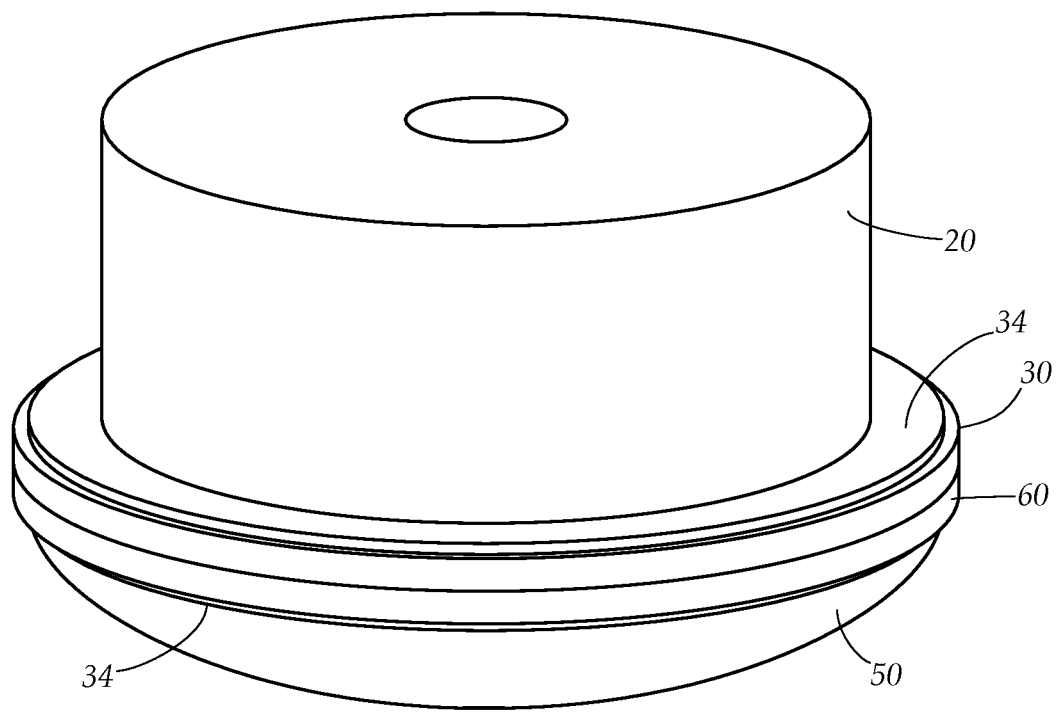
FIG. 5 is a perspective view from the top of the example embodiment of an assembled quick electrical connection.
Figure 6:
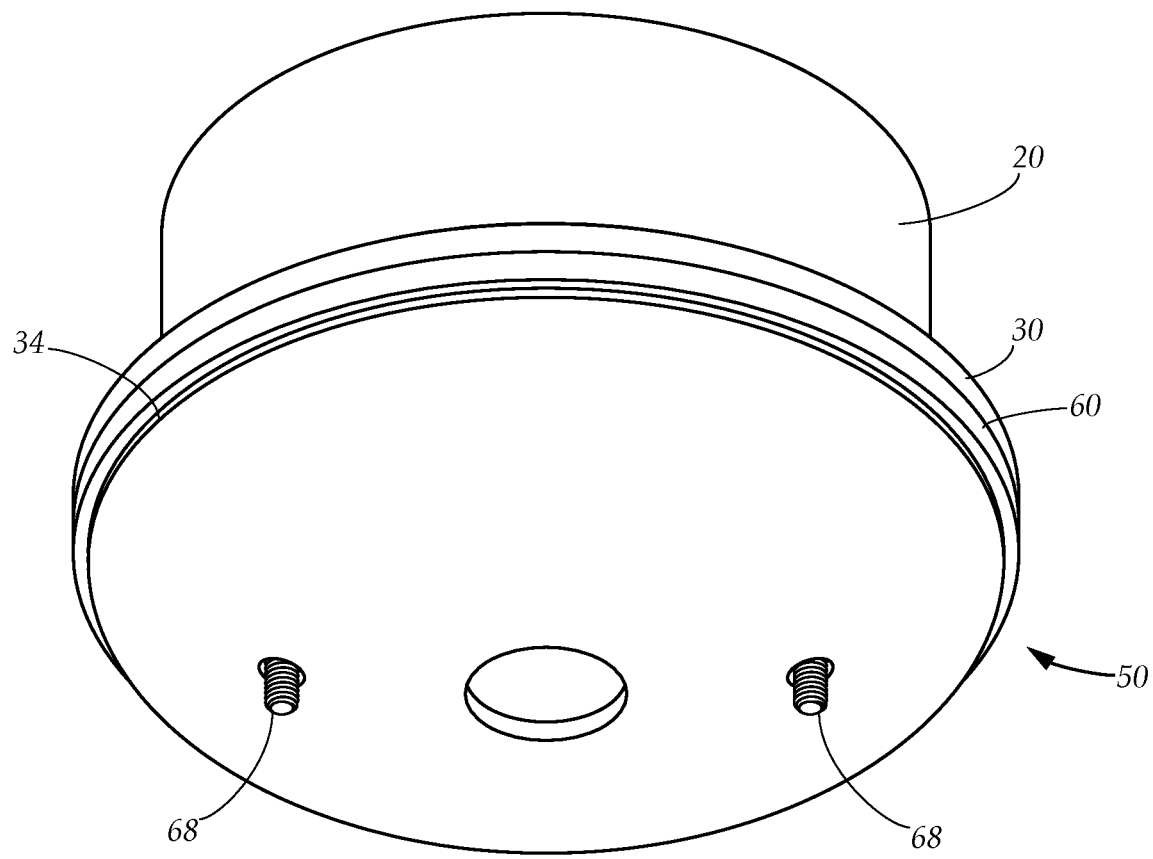
FIG. 6 is a perspective view from the bottom of the example embodiment of an assembled quick electrical connection.

In the junction box 20 are a plurality of threaded fastener channels 14 that align with a plurality of threaded openings 18 on the junction box plate 30. A plurality of fasteners 16 insert through the junction box plate bottom 30B into the threaded openings 18 and into the threaded fastener channels 14 in the junction box 20, thereby attaching the junction box plate 30 to the junction box 20. The junction box 20 with the attached junction box plate 30 is ready to connect to a fixture 50 in the system as illustrated in FIGS. 5 and 6.

Figure 3:
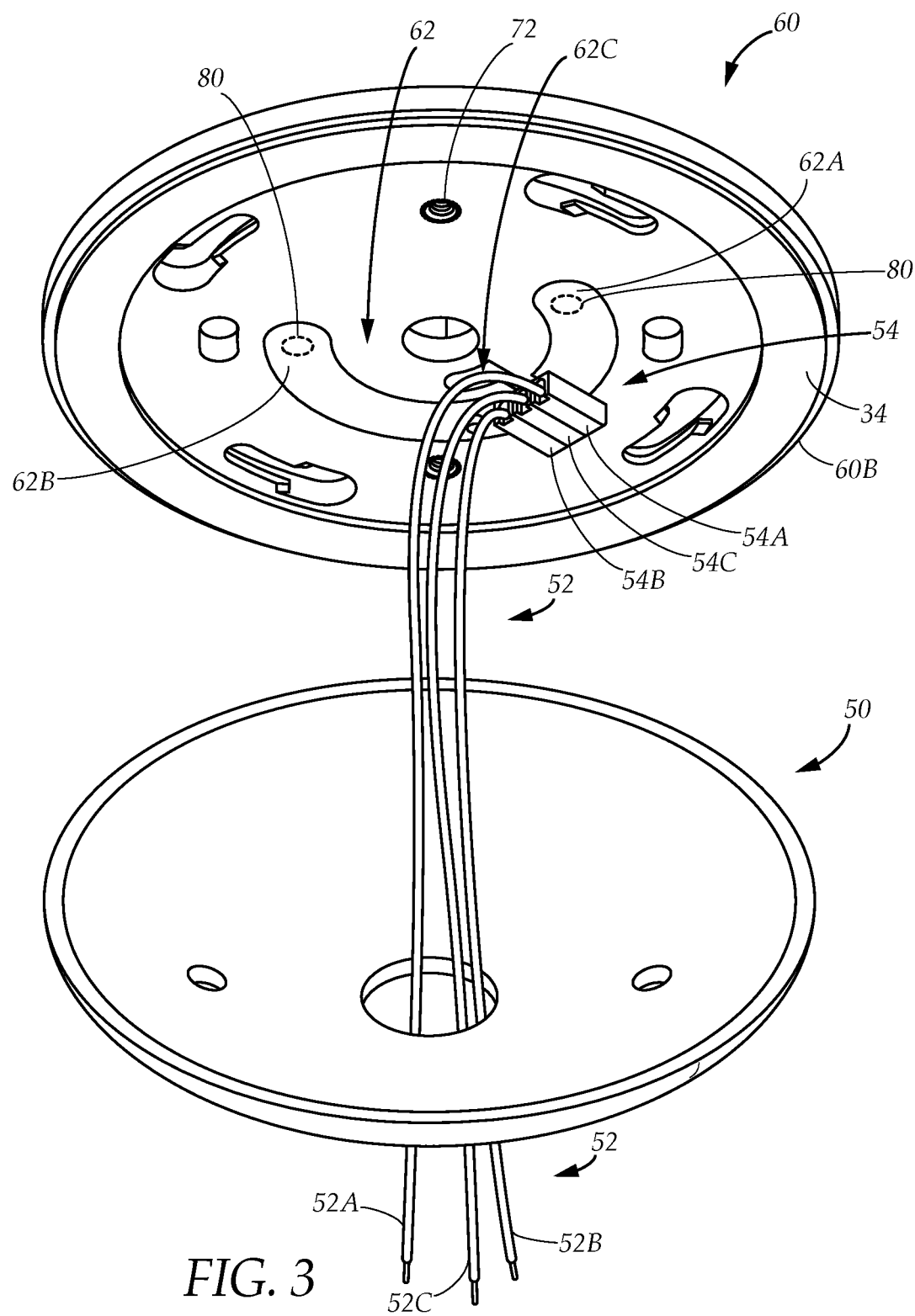
FIG. 3 is a perspective exploded view of the example embodiment of a fixture with a fixture plate in the system for quick electrical connection.
Figure 4:
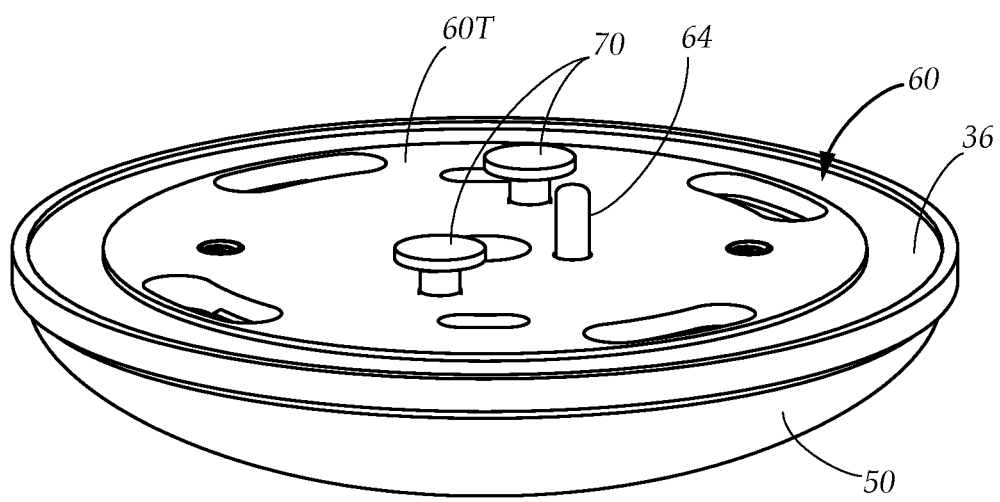
FIG. 4 is a perspective view of the example embodiment of an assembled fixture with the fixture plate in the system for quick electrical connection.

Referring to FIGS. 3 and 4, a fixture plate 60 attaches to the fixture 50. The fixture plate 60 has a fixture plate top 60T and a fixture plate bottom 60B. The fixture 50 has a plurality of fixture wires 52, a fixture line wire 52A, a fixture neutral wire 52B and a fixture ground wire 52C.

The fixture plate 60 has a plurality of fixture wire terminals 54, a fixture line terminal 54A, a fixture neutral terminal 54B and a fixture ground terminal 54C.

The fixture plate 60 has a fixture conductive plate 62. The fixture conductive plate 62 has a pair of arcuate arms, a first arcuate arm 62A and a second arcuate arm 62B. The fixture conductive plate 62 has a ground pin base 62C connecting to a ground pin 64.

The second fixture wire terminal 54B is electrically connecting to the fixture neutral wire 52B and is electrically connecting to the second fixture arcuate arm 62B, thereby placing the fixture neutral wire 52B in electrical communication with the second fixture arcuate arm 62B.

The third fixture wire terminal 54C is electrically connecting to the fixture ground wire 52C and is electrically connecting to the ground arm 62C, thereby placing the fixture ground wire 52C in electrical communication with the ground arm 62C.

On the fixture plate top 60T are a pair of conductive pins 70, a first conductive pin and a second conductive pin. The conductive pins 70 insert through the fixture plate top 60T, through the fixture plate 60, touching a contact point 80 on the arcuate arms 62 on the fixture plate bottom 60B, the conductive pins 70 in electrical communication with the arcuate arms 62. The contact points 80 puts the fixture wires 52 in electrical communication through the fixture wire terminals 54 and arcuate arms 62 with the conductive pins 70.

A ground pin 64 inserts through the fixture plate top 60T, through the fixture plate 60, and is in electrical communication with the ground pin base 62C. The ground pin 64 puts the fixture ground wire 52C in electrical communication through the fixture ground wire terminal 54C and ground pin base 62C.

The fixture conductive track 62 is constructed from conducting materials such as steel, copper, aluminum and other conducting metals as non-limiting examples. The fixture conductive track 62 is resilient, which is defined herein the ability to spring back into shape after compression. In one example embodiment the junction box conducting track 40 and the fixture conducting track 62 are preferably fabricated from spring steel or similar conducting metals that are resilient.

The fixture plate bottom 30 is constructed from non-conducting insulating material, such as the non-limiting examples of plastic, wood, rigid polyurethane foam rubber or other similar materials.

FIGS. 5 and 6 show the system when assembled. The junction box plate 30 connects to the fixture plate 60, thereby connecting the junction box 20 to the fixture 60. Gaskets 34, shown in detail in FIG. 9 and explained hereinbelow are between the fixture 50 and fixture plate 60 as shown as well as between the junction box plate 30 and fixture plate 60 and between the junction box 20 and junction box plate 30.

After assembly, the junction box 20 and the fixture 50 are joined by a pair of threaded rods 68.

Figure 7:
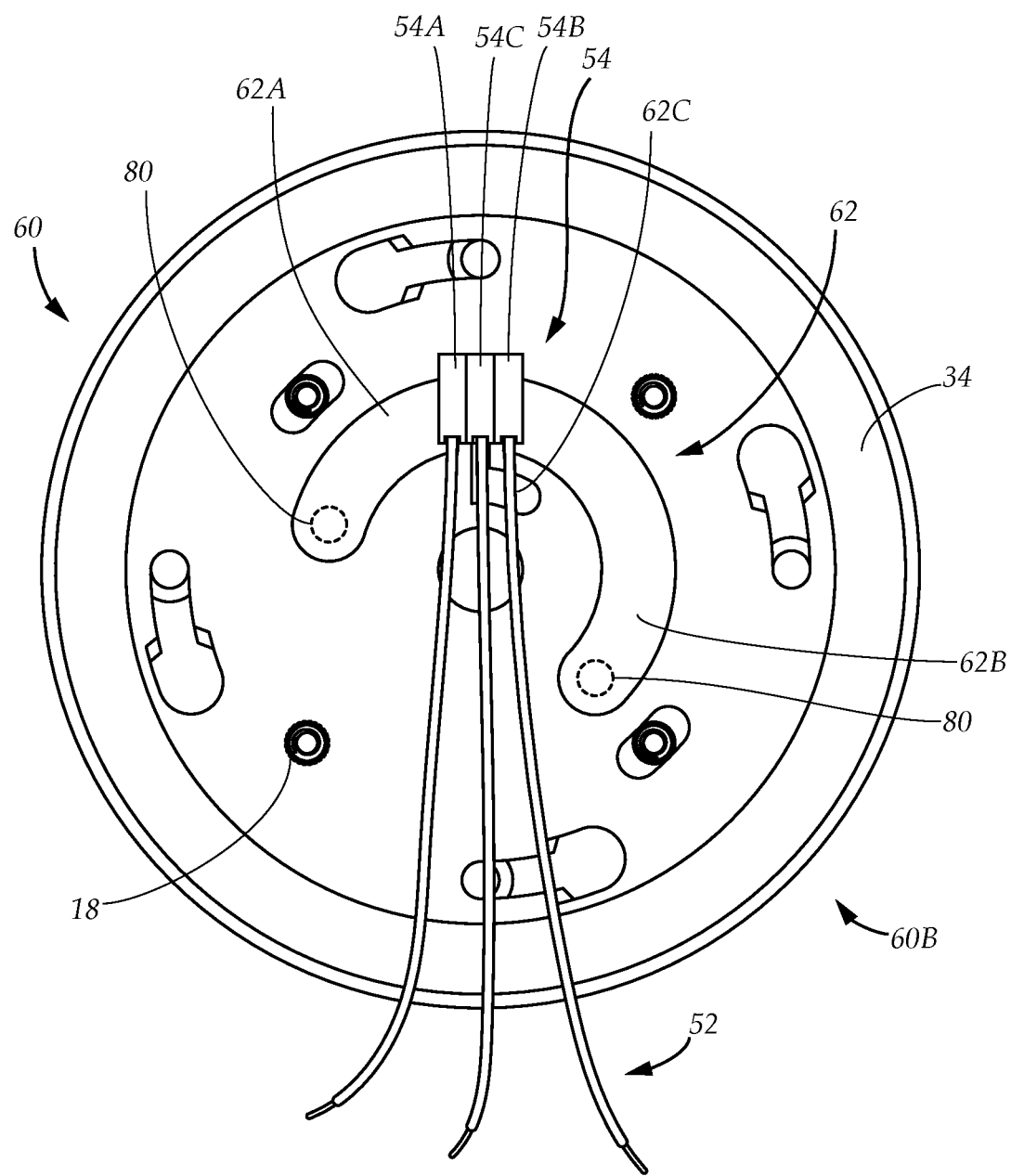
FIG. 7 is a top plan view of the example embodiment of the fixture plate in the system for quick electrical connection.
Figure 8:
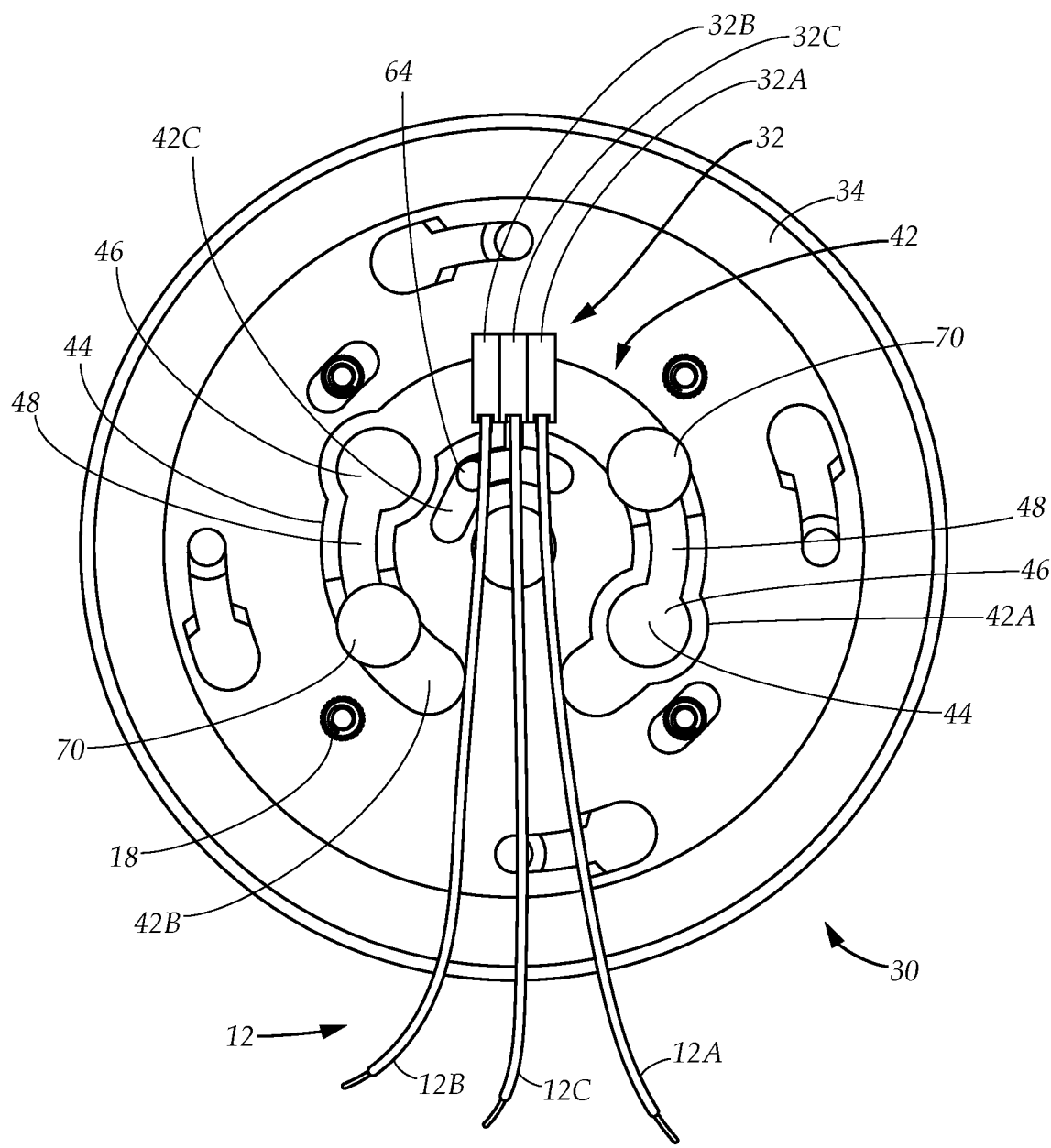
FIG. 8 is a bottom plan view of the example embodiment of the junction box plate in the system for quick electrical connection.

The electrical connection between the junction box and the fixture is better shown in FIGS. 7 and 8. Referring to FIG. 8, the conductive pins 70 on the fixture plate (not shown in the drawing) insert through the heads 46 of the openings 44 in the arcuate arms 42A, 42B and the fixture plate with the fixture attached rotates until the conductive pins are in the tails 48. The conductive pins 70 are in electrical communication with the arcuate arms 42 of the junction box conductive track 40.

The junction box wires 12 are in electrical communication with the junction wire terminals 32, the junction wire terminals 32 are in electrical communication with the arcuate arms 42 of the junction box conductive track 40; the arcuate arms 42 of the junction box conductive track 40 are in electrical communication with the conductive pins 70; the conductive pins are in electrical communication with the fixture conductive track 62 on the fixture plate 60 at the contact points 80, the fixture conductive track are in electrical communication with the fixture wires 52 through the fixture wire terminals 54, thus completing the circuit between the junction box 20 and the fixture 50.

Figure 10A:
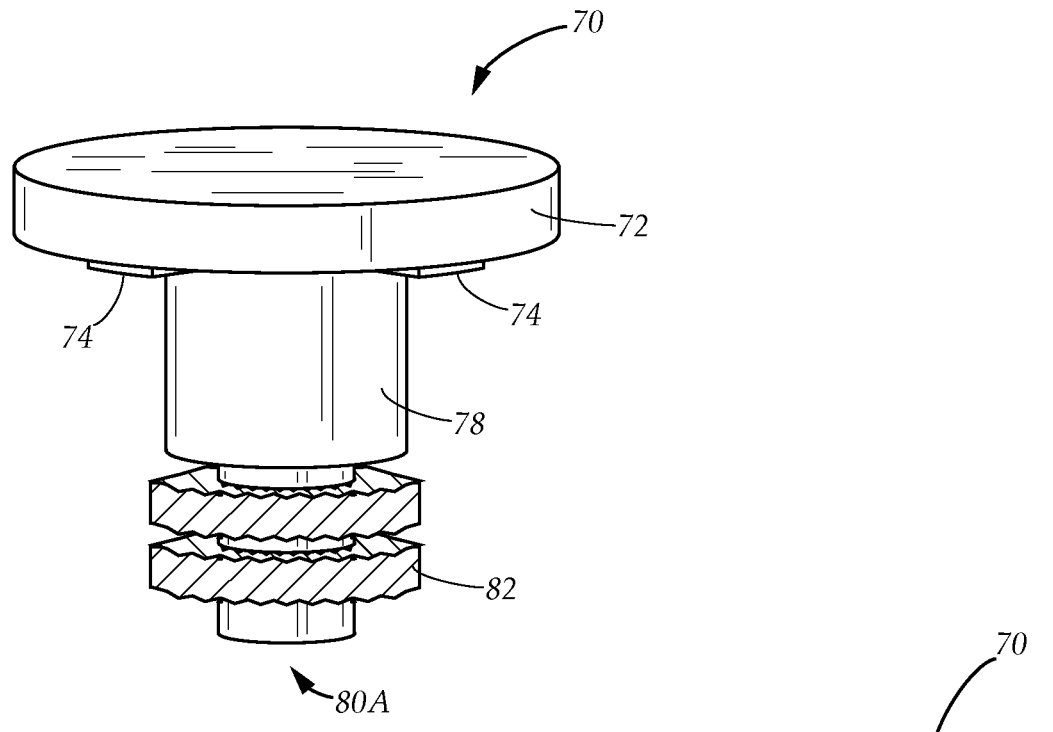
FIG. 10A is a perspective view from the top of an example embodiment of a conductive pin of the system for quick electrical connection.
Figure 10B:
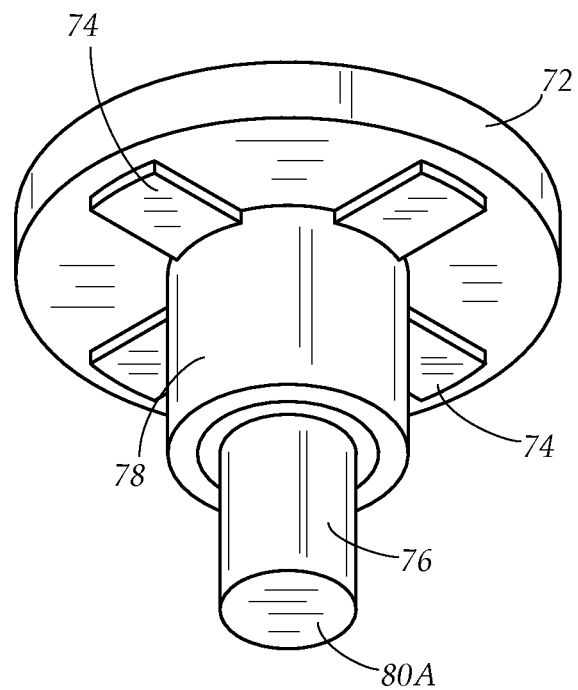
FIG. 10B is a perspective view from the bottom of the example embodiment of the conductive pin of the system for quick electrical connection.

FIGS. 10A and 10B show the conductive pins 70 in detail. The conductive pins have a head 72 and a conducting shaft 76. The conducting shaft 76 has a conductive shaft bottom. Beneath the head 72 are a plurality of conducting contact arms 74 in electrical communication with the conducting shaft 76. The conducting contact arms 74 are in a X-configuration, each arm at a right angle to the next.

The head 72 is non-conductive and the conducting shaft 76 has a partial non-conductive sheath 78 covering the conducting shaft 76 below the head 72. Inside the fixture plate are a pair of conductive threaded nuts 82 molded into the fixture plate (which is not shown). The threaded nuts 82 cover the conducting shaft below the non-conductive sheath 78 and the conducting shaft bottom 80 is in electrical communication with fixture plate conductive track 62 as shown in FIG. 3.

FIGS. 7 and 8 demonstrate the method in the system for making the quick electrical connection between the junction box and the fixture when the junction box is fabricated with the junction box plate 30 as described hereinabove and the fixture is fabricated with fixture plate 60 as described hereinabove.

The user making the quick electrical connection begins by inserting the conductive pins 70 on the fixture plate 60 into the circular heads 46 of the openings 44 on the junction box conductive track 40. The user then makes the connection by rotating the fixture plate 60 by rotating the fixture moving the conductive pins from the circular heads 46 of the openings to the curved tails 48 of the openings 44 completing the circuit as described hereinabove. These steps do not require tools. This step is followed by affixing a plurality of threaded mount rods 68 into a plurality of threaded nuts 18 making the non-electrical union of the fixture and junction box as shown in FIG. 6.

Referring to FIGS. 1-4 and 7-8, if the junction box 20 is not fabricated with the junction box plate 30 as described hereinabove and the fixture 50 is not fabricated with fixture plate 60 as described hereinabove, the user can retrofit the junction box 20 and fixture 50 by installing the junction box plate 30 and the fixture plate 60.

To install the junction box plate 20, the user starts by connecting the house wires 12 to the junction wire terminals 32 with the gasket 34 between the junction box plate 30 and the junction box 20 with the house ground wire 12C connecting to a junction ground wire terminal 32C. To install the fixture box plate to the fixture, the user starts by connecting the fixture wires 52 to the fixture wire terminals 54 in a mirror image to the junction wire terminals 32 on the junction box plate 30.

In the drawings, the placement of the fixture wire terminals 54 for the fixture line wire 52A and the fixture neutral wire 52B are not a limitation, nor is the placement of the junction wire terminals 32 for the house line wire 12A and the house neutral wire 12B a limitation. Those of ordinary skill in the art recognize that only requirement is that the fixture wire terminals 54 are the mirror image of the junction wire terminals 32 when the fixture plate top 60T contacts the junction box plate bottom 30B.

Once the junction box plate 30 and fixture plate 60 are in place, whether fabricated or installed, the method continues as described hereinabove.

In the drawings, the junction box 20 is shown as a circle. It is understood by those of ordinary skill in the art that a circular junction box 20 may be placed within a square junction box of a slightly larger diameter or the circular junction box may replace the square junction box and the installation of the system continue.

Figure 9:
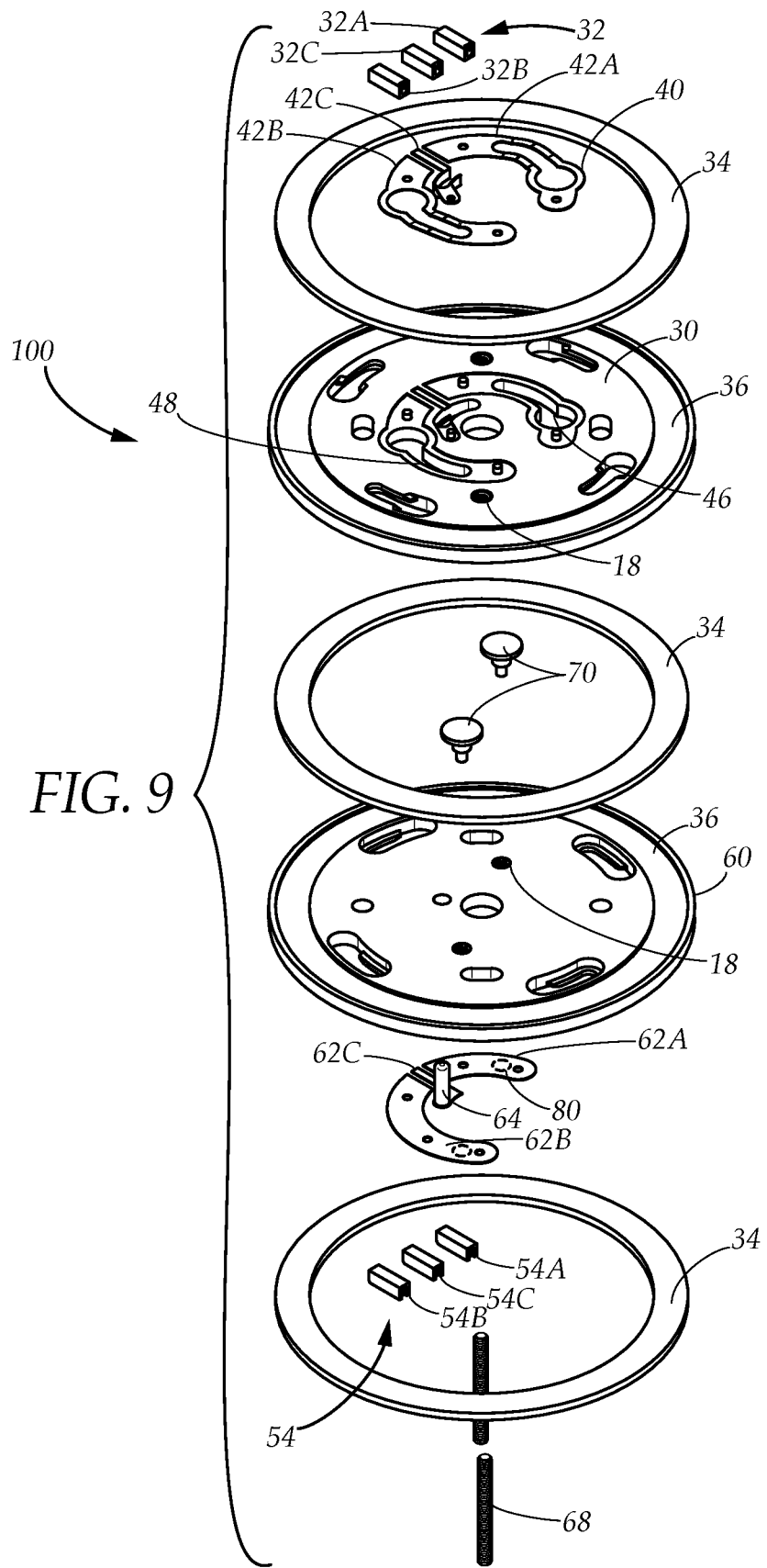
FIG. 9 is an exploded view of the example embodiment of the system for quick electrical connection.

FIG. 9 demonstrates an exploded view of the system and the components of a kit for retrofitting a junction box and a fixture. The kit 100 comprises the plurality of gaskets 34, the pair of conductive pins 70, the junction box plate 30, the fixture plate 60 and the pair of threaded rods 68. In one example embodiment, the junction box plate 30 includes the junction box conductive track 40 and the junction wire terminals 32 and the fixture plate 60 includes the fixture conductive track 62, the fixture wire terminals 54 and the ground pin 64.

In another example embodiment, the kit 100 further comprises the plurality of gaskets 34, the pair of conductive pins 70, the junction box plate 30, the fixture plate 60, the pair of threaded rods 68, a junction box conductive track 40, junction wire terminals 32, the fixture conductive track 62, the fixture wire terminals 32 and the ground pin 64 as separate items.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected unless otherwise stated.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a system making a quick electrical connection between a junction box and a fixture, connecting the fixture to house current. The disclosure is illustrated by example in the drawing figures, and throughout the written description. It should be understood that numerous variations are possible, while adhering to the inventive concept. Such variations are contemplated as being a part of the present disclosure.

What is claimed is:

1. A conductive pin, comprising:
   a non-conductive head;
   a conducting shaft with a conductive shaft bottom;
   a partial non-conductive sheath covering the conducting shaft below the head; and
   a plurality of conducting contact arms beneath the head in electrical communication with the conducting shaft, the conducting contact arms in a X-configuration, each conducting contact arm at a right angle and separate to an adjacent conducting contact arm.

* * * * *